(12) United States Patent
Martino

(10) Patent No.: US 8,274,514 B1
(45) Date of Patent: Sep. 25, 2012

(54) METHOD AND APPARATUS FOR SEARCHING, REPLACING AND MODIFYING EXPLICIT AND IMPLICIT SHAPE IN SKETCH-STYLE DRAWINGS OF VARIOUS STYLES

(76) Inventor: Jacquelyn Annette Martino, Cold Spring, NY (US)

( * ) Notice: Subject to any disclaimer, the term of this patent is extended or adjusted under 35 U.S.C. 154(b) by 1026 days.

(21) Appl. No.: 12/212,648

(22) Filed: Sep. 18, 2008

Related U.S. Application Data

(60) Provisional application No. 60/994,405, filed on Sep. 19, 2007.

(51) Int. Cl.
  *G06T 11/20* (2006.01)
  *G06K 9/46* (2006.01)

(52) U.S. Cl. .................. 345/442; 345/441; 382/203

(58) Field of Classification Search .................. 345/441, 345/442; 382/203
  See application file for complete search history.

(56) References Cited

U.S. PATENT DOCUMENTS

| | | | |
|---|---|---|---|
| 6,046,753 A * | 4/2000 | Searby et al. .................. | 345/537 |
| 6,707,461 B1 | 3/2004 | Tomack | |
| 2006/0075348 A1* | 4/2006 | Xu et al. ...................... | 715/730 |
| 2006/0232603 A1 | 10/2006 | Schuster | |
| 2009/0207174 A1* | 8/2009 | Chen ............................ | 345/442 |

OTHER PUBLICATIONS

Stiny G, 1976, "Two exercises in formal composition," Environment and Planning B: Planning and Design 1976(3): p. 187-210.

Stiny, G., Pictorial and formal aspects of shape and shape grammars. 1975, Basel; Stuttgart: Birkhauser. xv, 399 p.

Mortenson, M.E., Geometric modeling. 1985, New York: Wiley. xvi, 763 p.

Mortenson, M.E., Computer graphics: an introduction to the mathematics and geometry. 1989, New York, N.Y.: Industrial Press. x, 381 p.

Stone, M.C. and Derose, T.O., A geometric characterization of parametric cubic curves. ACM Transactions on Graphics (TOG), 1989. 8(3): p. 147-163.

Vincent, S., Fast Detection of the Geometric Form of Two-Dimensional Cubic Bezier Curves. Journal of Graphics Tools, 2002. 7(3): p. 43-51.

Shirley, P. and Ashikhmin, M., Fundamentals of computer graphics. [2nd ed. 2005, Wellesley, Mass.: AK Peters. xv, 623 p.

Schneider, P. J. and Eberly, D. H., Geometric Tools for Computer Graphics, (The Morgan Kaufmann Series in Computer Graphics 1st ed. 2002) 1056 p.

O'Keefe, RA, The craft of Prolog. Logic programming. 1990, Cambridge, Mass.: MIT Press. xix, 387 p.

* cited by examiner

*Primary Examiner* — James A Thompson
*Assistant Examiner* — Jed-Justin Imperial
(74) *Attorney, Agent, or Firm* — Anne Barschall

(57) ABSTRACT

A computer method and apparatus for selecting and manipulating curvilinear shapes entered by a user is shown. The curvilinear shapes are represented within the computer using parameterized equations. The representation is reduced to maximal elements. The maximal elements are extended. Registration points of the extended maximal elements are then identified. Once the registration points and maximal elements are known, curvilinear shapes can be matched using those maximal elements and registration points. Therefore a user can create a sketch that looks like part of a drawing and the computer can find the corresponding section for the user and transform it.

20 Claims, 13 Drawing Sheets

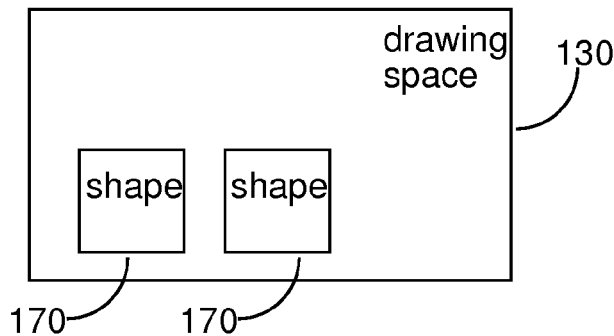
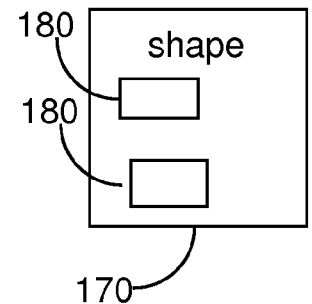
Fig. 2A                    Fig. 2B
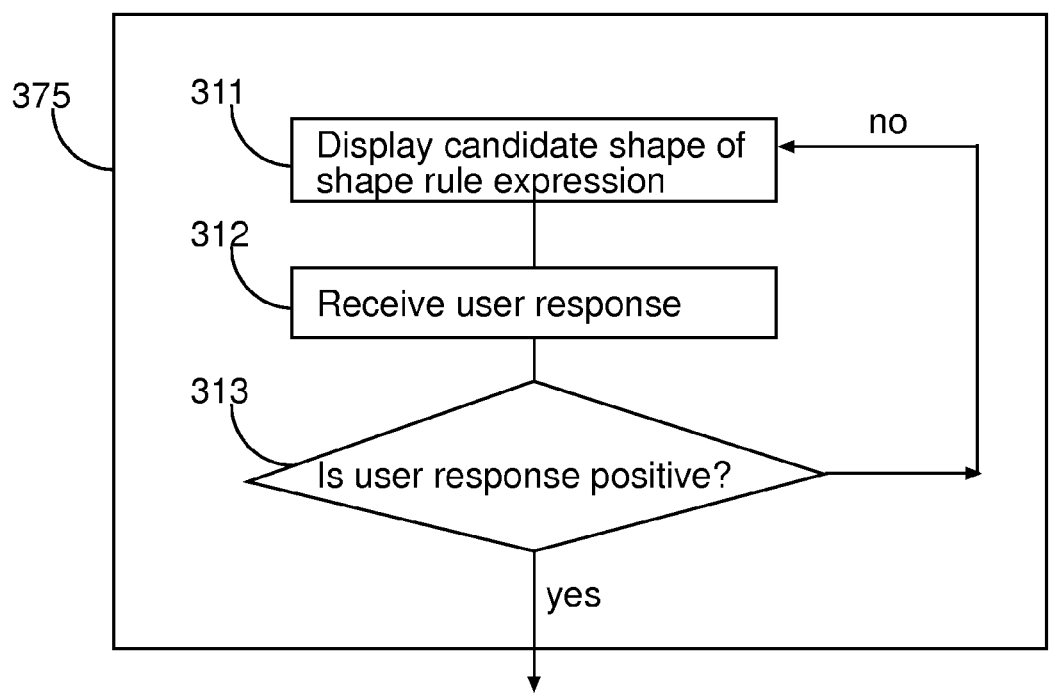
Fig. 3A

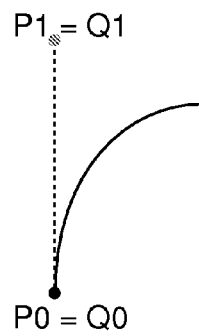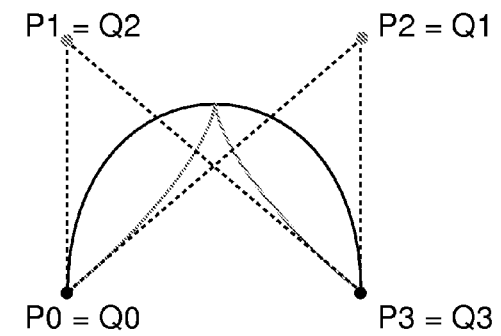
Fig. 6A                     Fig. 6A'
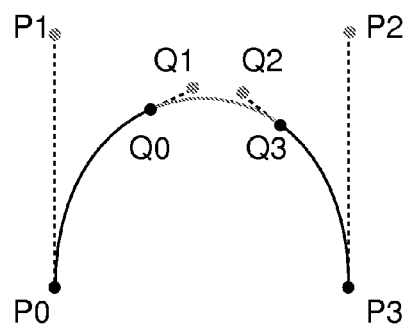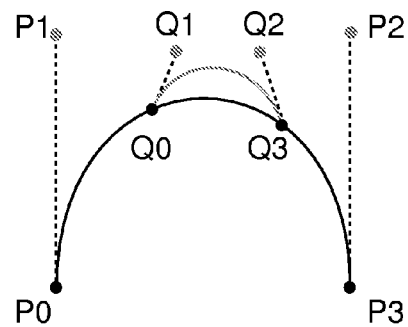
Fig. 6B                     Fig. 6B'

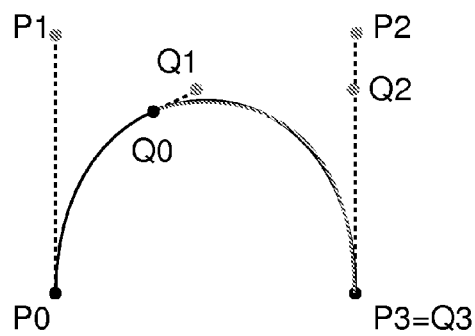
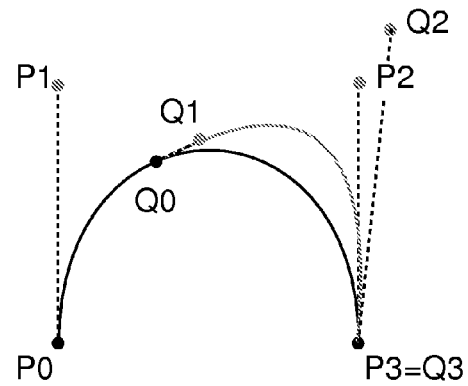
Fig. 6C                    Fig. 6C'
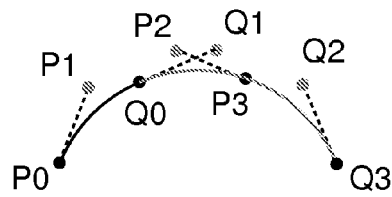
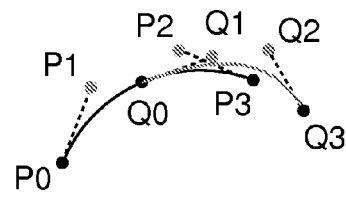
Fig. 6D                    Fig. 6D'
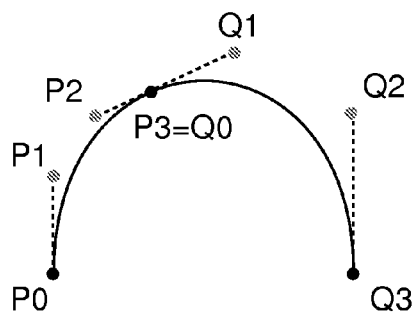
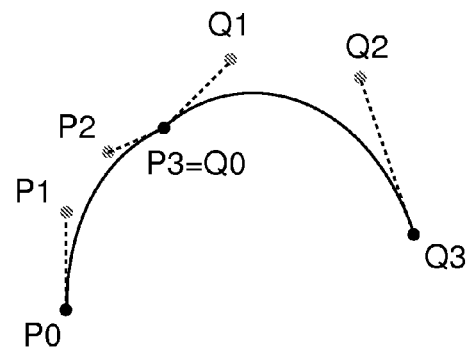
Fig. 6E                    Fig. 6E'

METHOD AND APPARATUS FOR SEARCHING, REPLACING AND MODIFYING EXPLICIT AND IMPLICIT SHAPE IN SKETCH-STYLE DRAWINGS OF VARIOUS STYLES

RELATED APPLICATION

The present application claims benefit of the filing date of provisional application 60/994,405 filed Sep. 19, 2007, which is incorporated herein by reference.

BACKGROUND

1. Field of the Invention

The invention relates to the field of computer graphics and in particular to selecting and manipulating hand drawn shapes within computer graphics software.

2. Related Art

A number of computer graphics programs exist that allow a user to enter drawing material in the form of a sketch, such as Adobe Freehand™. One issue that arises in these programs relates to selecting and manipulating portions of a drawing. Such a selection, at its most crude, might involve creating a box around a portion of the drawing and then doing something with the box, like cutting out a portion of the drawing. Another approach appears in Stiny G, 1976, "Two exercises in formal composition," Environment and Planning B: Planning and Design 1976 3 187-210. This approach allows a user to select a rectilinear shape within a drawing and manipulate that shape. This document describes a shape computation algorithm to specify the shape, rather than having the user draw a box around the shape.

Known approaches to shape computation and algorithmic art-making within the fields of shape grammars and computer graphics still do not consider the immediacy of the artist's mark in drawing and painting. The drawing and painting space is an expressive and dynamic problem space that is constantly reframed with each successive mark. Moreover, in human drawn sketches, very few—if any—shapes appear that are strictly rectilinear.

SUMMARY OF THE INVENTION

It would be desirable for a user to be able to look at a curvilinear drawing, sketch a portion of that drawing, and have the computer figure out what portion of the drawing is intended by the user.

The present application discloses an advantageous method, apparatus, and software for curvilinear shapes that supports both explicit and implicit shape detection and selection. After the shape is detected and selected, it can be transformed, e.g. by drawing (shape union), rotating, stretching, scaling, translating or erasing (shape difference) computationally.

Objects and advantages will be apparent in the following.

BRIEF DESCRIPTION OF THE DRAWINGS

The invention will now be described by way of non-limiting example with respect to the following figures.

FIG. 2A shows a block diagram of a data structure for a drawing space

FIG. 2B shows a block diagram of a data structure for a drawing object

FIG. 3A shows a flow diagram of a user receiving a shape indication and shape transformation candidate until satisfied with the candidate

DETAILED DESCRIPTION

Figure 1A:
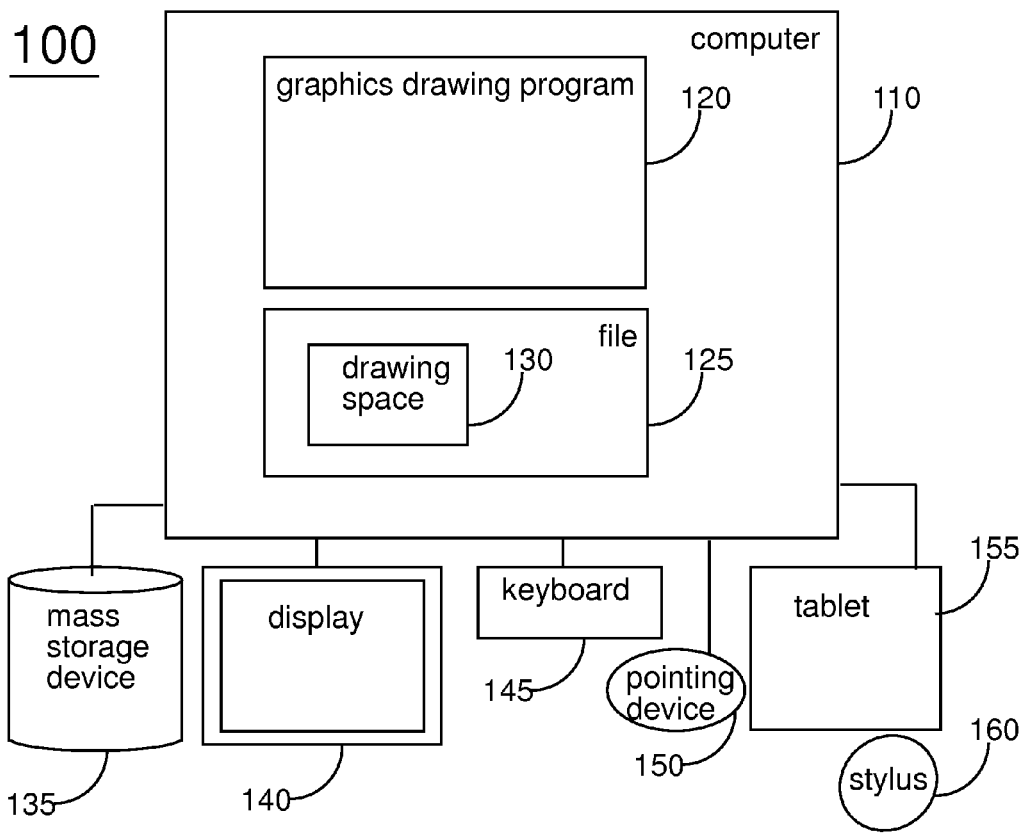
FIG. 1A shows a block diagram of a computer system that can be used to perform the shape manipulations in accordance with the invention

As shown in FIG. 1A, a computer-implemented graphics drawing system 100 includes a general purpose programmable digital computer 110, a mass storage device 135, a display 140, input devices such as a keyboard 145, a tablet 155 and stylus 160 and a pointing device 150. A touch sensitive screen might serve as a single input/output device in some cases. A printer might also be useful for output. In general herein "input/output device" means an input device, an output device, or a device that performs both input and output operations. The computer 110 is of conventional construction and includes a processor and memory. The computer 110 executes a graphics drawing program 120 which manipulates a graphics file 125 that includes one or more drawing space objects 130. The computer graphics system 110 can be connected to other computer systems and/or peripheral devices, such as over a network. Programs and data can reside on a storage device or devices associated with the computer 110 or be distributed on a storage device or devices associated with one or more separate computer systems. The elements of the system can be of any suitable type and are not limited to any particular processor, storage device, or other peripherals.

Figure 1B:
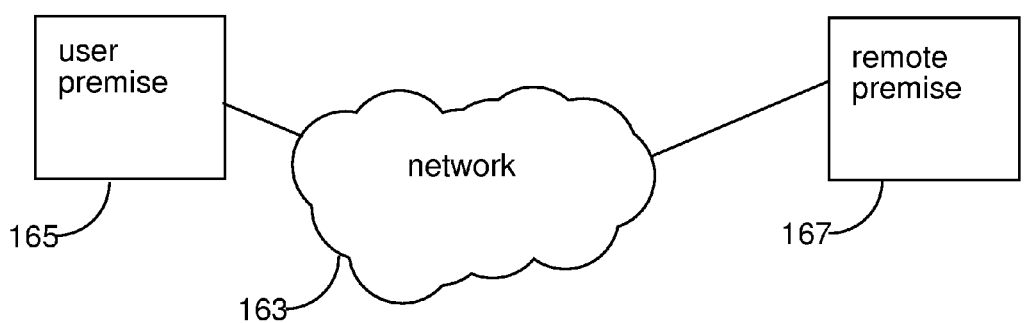
FIG. 1B shows a block diagram of user premises both remote and local to the user.

As shown in FIG. 1B, in some cases, data input and output may be at a user premises 165, but some or all data processing may be at a remote premises 167. The remote premises may be connected to the user by 163 in the form of a LAN or the Internet and may even be in a different country from the user. This may be particularly desirable if the drawing becomes very complex, for instance if it is in multiple dimensions or has color, so that it requires more processing.

One user might enter and edit a drawing. Alternatively, the user editing the drawing might be a different one from the user who originally entered the drawing—or there might be multiple users editing a drawing.

As shown in FIG. 2A, each drawing space object 130 can have one or more explicit shape objects 170. As shown in FIG. 2B each explicit shape object 170 may include one or more explicit or implicit sub-shape objects 180.

Explicit shapes are those drawn directly by the user in the drawing space while implicit shapes are those that emerge as a result of explicitly drawn shapes. Explicit and implicit shapes may by rectilinear or curvilinear, though most hand drawn shapes, even if intended to be rectilinear, will in fact be curvilinear.

FIG. 3A shows a flowchart of operation of a user interface for the invention. At 375 the interface is invoked, such that the system displays the candidate shapes 311 in the drawing for a user response 312 to determine which candidate shape should be transformed in accordance with the shape rule expression. The loop 313 continues until the user sees an acceptable candidate shape.

Figure 3B:
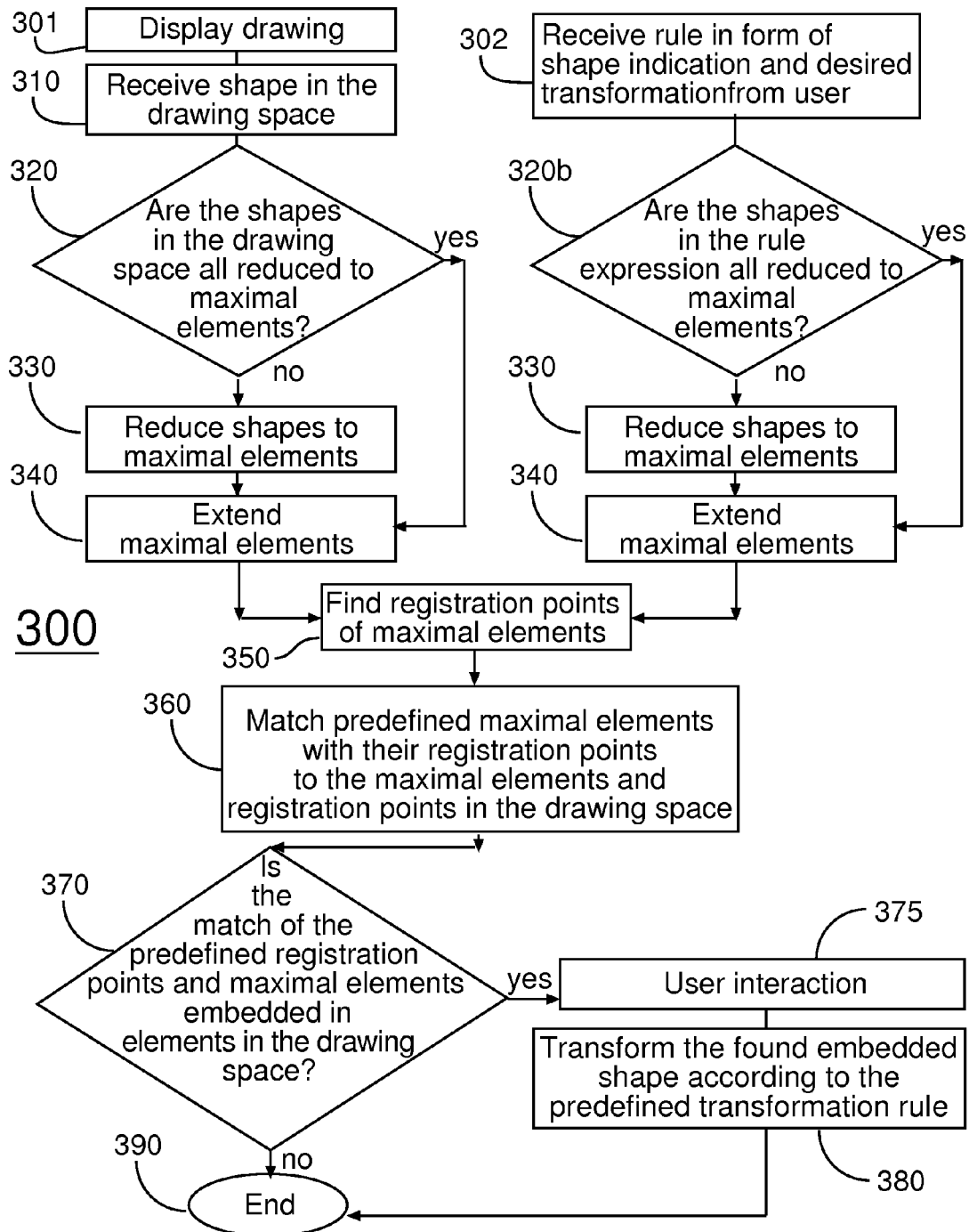
FIG. 3B shows a flow diagram of a method for searching, replacing and modifying an explicit or implicit shape

FIG. 3B shows a method 300 for searching and transforming an explicit or implicit shape or sub-shape object in the drawing space 130 in the graphics drawing program 120. In the initial example, a drawing space object 130 exists which may or may not contain shape objects 170 or 180. The drawing space object is displayed in 301. In step 310, the user creates a new shape object 170. In step 320 the system determines if all the shape objects in the drawing space have been reduced to maximal elements. If so, the system continues to step 340 to extend all maximal elements. If not, then step 330 reduces all shape objects to maximal elements before continuing to step 340. Method 300 also shows a shape indication that is received at 302. The rule in this case is received from a user, interactively, but there might be other sources of rules, such as files. Alternatively, a shaped to be matched might be entered in some format other than the rules described herein. This indication is then transformed into a rule format, in which the left hand side of the rule is the shape indication the right hand side is the desired transformation. In step 320b the system determines if the shapes in the rule expression are all reduced to maximal elements. If so, the system continues to step 340 to extend all maximal elements. If not, then step 330 reduces all shapes in the rule expression to maximal elements before continuing to step 340. An explanation of boxes 350-390 appears below.

An element is a maximal element if it has no further decomposition. Maximal elements were previously described for rectilinear spaces in the Ph. D. dissertation, STINY, G., *Pictorial and Formal Aspects of Shapes and Shape Grammars and Aesthetic Systems*. 1975, University of California: Los Angeles. That article recognized five decomposition rules necessary for maximal elements in rectilinear spaces. These rules related to decomposing collinear elements. Those five rules were as in FIGS. 7A-E. For clarity, the lines are not drawn collinearly as they would appear on the canvas. The lines $L_0$ and $L_1$ are collinear and defined respectively by the points $(P_0, P_1)$ and $(Q_0, Q_1)$. $MaxL_0L_1$ is the maximal line representation.

Figure 7A:
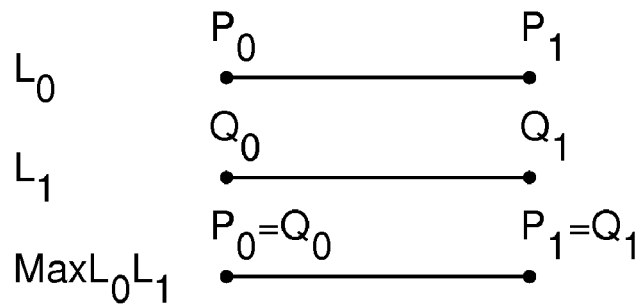
FIG. 7 shows the reduction rules for rectilinear shapes for determining maximal elements
Figure 7B:
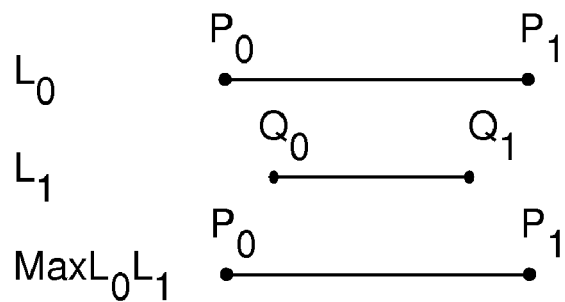
Figure 7C:
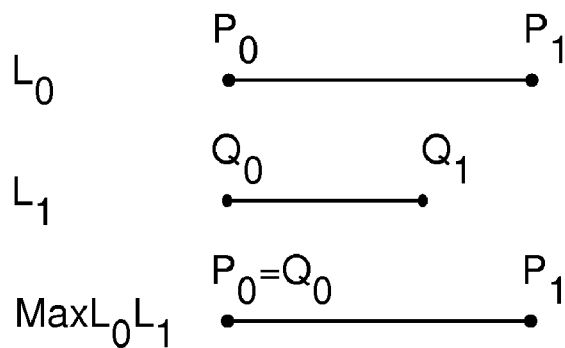
Figure 7D:
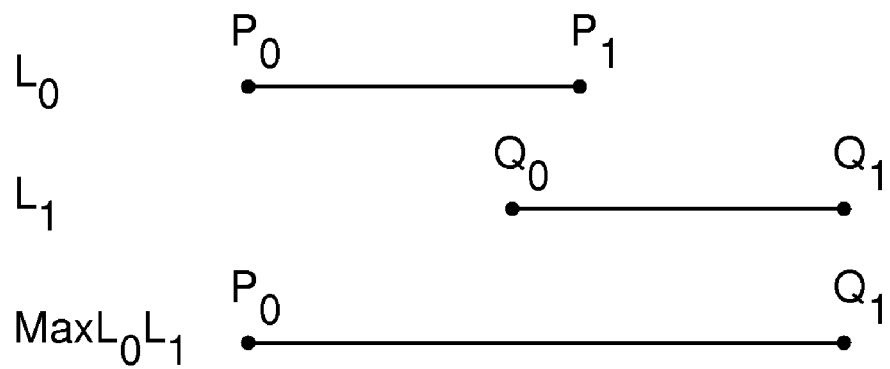
Figure 7E:
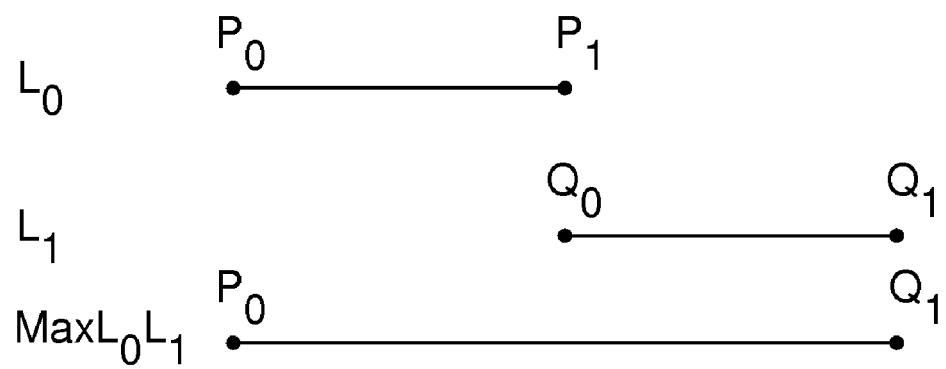

In FIG. 7A, both boundaries are shared. $L_0$ and $L_1$ represent the same line where $P_0=Q_0$ and $P_1=Q_1$. The points $(P_0, P_1)$ define the resultant maximal line. In FIG. 7B, There are no shared boundaries and complete overlap. $P_0<Q_0<Q_1<P_1$, the resultant maximal line is $(P_0, P_1)$. In FIG. 7C, there is one shared boundary and overlap where $P_0=Q_0$, $Q_1<P_1$. The resultant maximal line is defined by $(P_0, P_1)$. In FIG. 7D, there is no shared boundary and partial overlap of $L_0$ and $L_1$ where $P_0<Q_0<P_1<Q_1$. The resultant maximal line is the reduction defined by $(P_0, Q_1)$. In FIG. 7E, there is one shared boundary and no overlap where $P_1=Q_0, P_1<Q_1$. The reduction is defined by $(P_0, Q_1)$.

More generally, the following description explains how these rules have been recognized to be extendable to the curvilinear case. An element is a maximal element, if it is not part of any other shape object within the drawing space object and if it is uniquely describable. For example, any lines that are collinear and non-disjoint can be reduced to a maximal line. In the case of curves, continuity is the analog to collinearity and non-disjointness from the line case. Two curves are non disjoint if they have G0 continuity. To fulfill G0 continuity, two curves must join together at an endpoint. To fulfill G1 continuity, two curves must join with tangency. In other words using the first derivative, the directions of the two segment's tangent vectors must be equal at a join point. For our example, as defined here two curves have the property of "cocurvilinearity" if they exhibit G1 continuity.

Computer graphics programs may adopt any number of internal representations of curves. Typically, these representations are parametric, using a time parameter to draw curves in real time whenever the display needs to be refreshed. Specialized graphics processors will store drawn curves between refreshes. In the present application, one type of representation is chosen as an example. This is the cubic Bézier. More explanation of this type of representation will appear below. Nevertheless, it is believed that the invention will apply equally to other types of parametric or other internal representation.

For the purposes of the preferred embodiment, all curves shown are assumed to be in two dimensions and lying within a "canvas." A canvas can be taken to be an area visible on the display, or some area defined by the user or the software, which may be larger or smaller than the area visible on the display.

Figure 4:
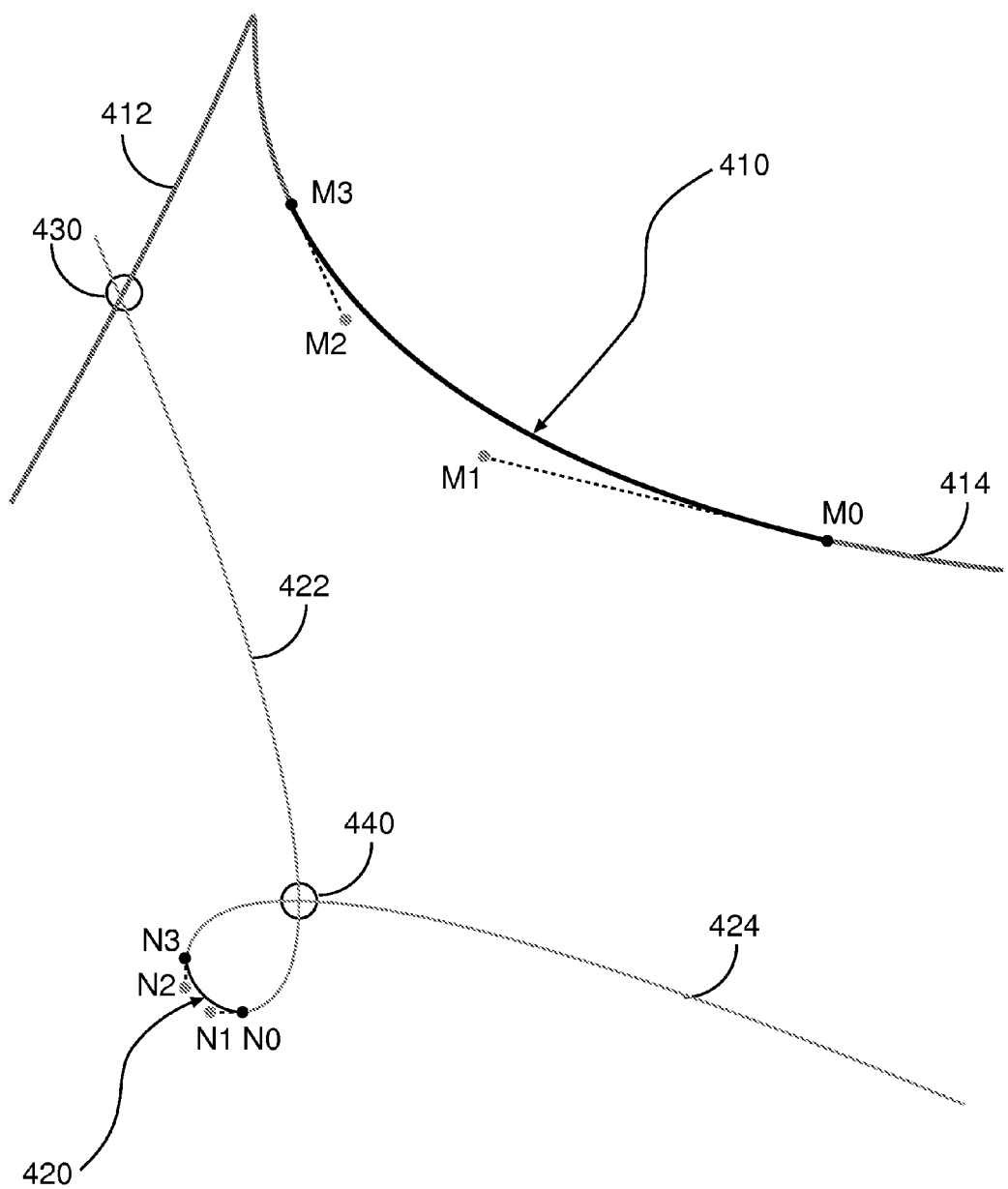
FIG. 4 shows extended maximal elements and the resultant registration points
Figure 8A:
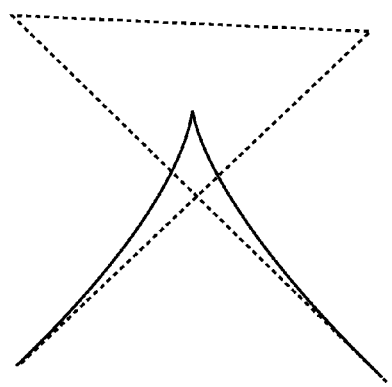
FIG. 8 shows the types of cubic Bézier curves
Figure 8B:
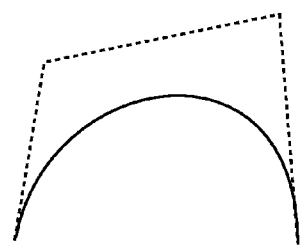
Figure 8C:
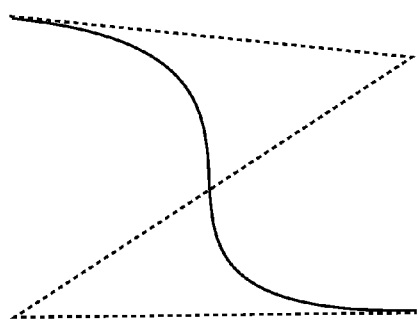
Figure 8D:
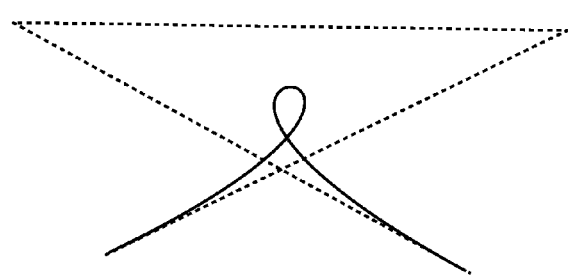
Figure 8E:
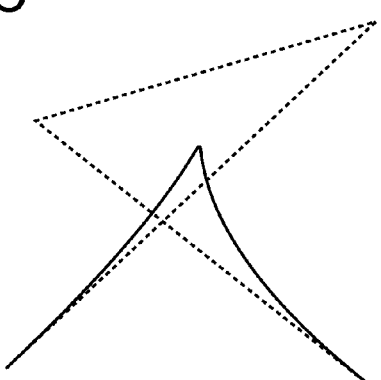

A line may be considered as a degenerate case of a cubic Bézier. In such a case, collinearity meets the requirements for G1 continuity and by default for G0 continuity as well. In the case of cubic Bézier curves, maximal curves will be of five (5) types as in FIG. 8A: cusp, FIG. 8B: arch, FIG. 8C: single inflection point, FIG. 8D: loop, FIG. 8E: bump. There are also the degenerate cases of a line and a point. Complex curves can be achieved, however, by joining these types piecewise. An arch is very likely to be embedded in another curve type as it degenerates to one of the other four types when extended. Given this, FIG. 4 shows an example drawing space object containing two maximal curves: a loop defined by 420, 422, 424 and a single inflection defined by 410, 412, and 414.

A shape object is "embedded" when it is part of, or within, another shape object. For the purposes of this application, the symbols "<=" denote the notion of within.

More formally, an element, E1, is embedded in E0 if and only if every maximal element in E1 is embedded in a maximal element in E0, i.e. E1<=E0. Hence a line, L1, is embedded in L0 if and only if every maximal element in L1 is embedded in a maximal element in L0, i.e. L1<=L0. And similarly, a curve, C1, is embedded in C0 if and only if every maximal element in C1 is embedded in a maximal element in C0, i.e., C1<=C0.

A Bézier curve is a parametric polynomial function that interpolates its control points. The polynomial can be of any degree. The curve will contain two end points plus a number of control points. In a typical computer graphics application, four control points, denoted P0, P1, P2, and P3, will be either entered or deduced to define the cubic Bézier curve. More about Bézier curves and how the control points are entered or deduced can be found in MORTENSON, M. E., *Geometric modeling*. 1985, New York: Wiley. xvi, 763 p and in MORTENSON, M. E., *Computer graphics: an introduction to the mathematics and geometry*. 1989, New York, N.Y.:

Industrial Press. x, 381 p. Where n is the curve degree, n−1 is the number of control points such that the total number of points is n+1. The polygon defined by the n+1 points is call the "convex hull," while the line that joins the points (P0 . . . Pn) is the control "polyline." Typically, the points of the curve are defined over the unit interval, 0<=t<=1, such that P0 corresponds to t=0 and Pn to t=1. The curve segment is of the form $$P(t) = \sum_{i=0}^{n} \binom{n}{i}(1-t)^{n-i}1^{i}P_i, 0 <= t <= 1 \quad (5)$$

where n is the degree of the curve, P is the point and t is time. For the linear, first degree form of the curve, the parametric line formula is:

$P(t)=(1-t)P0+P1$

Similarly the quadratic form is $P(t)=(1-t)^2 P0+2(1-t)P1+t^2 P2$ (6)

The formula for a cubic Bézier curve is:

$P(t)=(1-t)^3 P0+3(1-t)^2 tP1+3(1-t)t^2 P2+t^3 P3$ (7)

Step 330 of method 300 is described here for reducing two cubic Bézier curves to their maximal element representation. Generally, responsive to a user entered drawing, the data processing system will generate some number of cubic Bézier curves. Each generated curve will be an approximation of a portion of the drawing. The number of generated curves may bear little relationship to the user's idea of how she has generated the drawing. What seems like a single stroke to the user might result in a large number of internally generated curves, each approximating a portion of the user's artwork. Alternatively, several strokes might end up as one curve.

Given two curves, P and Q, as in FIGS. 6A-E & A'-E' and the formula for a cubic Bézier as in (7). In the discussion below, control points of curves will be indicated by the letter name of the curve plus a number in the range of zero to three. The letter number at the start of each paragraph indicates the sub-figure of FIG. 6 that illustrates the point made. Thus paragraph A refers to FIG. 6A, etc.

(A) If P0=Q0 and P3=Q3 and the control polyline of each curve is identical, then the curves are identical. This is the test of control polylines. Discard Q and keep P as the maximal curve. More about control polylines may be found in STONE, M. C. and DEROSE, T. D., "A geometric characterization of parametric cubic curves". ACM Transactions on Graphics (TOG), 1989. 8(3): p. 147-163 and in VINCENT, S., *Fast Detection of the Geometric Form of Two-Dimensional Cubic Bézier Curves*. Journal of Graphics Tools, 2002. 7(3): p. 43-51.

(B) If Q0 and Q3 are both embedded in P, then divide P into three (3) curves R, S, T from the intervals defined by P0 to Q0, Q0 to Q3 and Q3 to P3, respectively. If R, S or T is identical to Q by the test of control polylines, then discard Q, R, S, and T and keep P as the maximal curve.

(C) If Q0 is embedded in P and Q3=P3, then if P2P3 is collinear with Q2Q3, divide P at Q0 to form two (2) curves R and S. If either R or S is identical to Q by test of control polylines, then discard Q, R, and S and keep P as the maximal curve.

(D) If Q0 is embedded in P and P3 is embedded in Q, divide P at Q0 into curves R, S and divide Q at P3 into curves T, W. If S is identical to T by test of control polyline, then join P and Q and evaluate according to case (E) below.

(E) If P3=Q0 and there is G1 continuity at the shared point and if at least one of P or Q is of type arch, then join the curves to make curve R. Now compare P with R and Q with R as per each of cases A thru D above. If none of the requirements is met, discard R and keep P and Q as maximal curves To illustrate how each of these tests might fail to result in finding a maximal element, again refer to FIG. 6. The figures with the apostrophes after the letter show counter examples from the previous figures. Again, in the paragraphs below, the letter indicates the figure, e.g. A' refers to FIG. 6A'.

(A') P0=Q0 and P3=Q3, but the control polylines are not identical (B') Q0 and Q3 are both embedded in P, but none of R, S, or T is identical to Q (C') Q0 is embedded in P and Q3=P3, but P2P3 is not collinear with Q2Q3

(E') Q0 is embedded in P, but P3 is not embedded in Q (E') P and Q have G0 continuity, but not G1 continuity To extend the curves as in step 340 of method 300, the processor will use formula (7) and adjust the t interval as desired. For example, using the interval −6<=t<=6 extends the two arch curves 410 and 420 as in FIG. 4. Note that each of the arch curves 410 and 420 degenerate to other curve types where 412, 410, 414 form a bump and 422, 420, 424 form a loop.

In general, when cubic Bézier curves are extended, their extensions produce unexpected results, MORTENSON, M. E., *Geometric modeling*. 1985, New York: Wiley. xvi, 763 p. It would be tempting to dismiss these extensions as meaningless artifacts of the approximation process. Indeed, there appears to be little if any literature exploring these extensions or their meanings; however, the inventor's testing has shown that—surprisingly—these extensions are in fact meaningful and do lead to a useful representation of portions of a drawing.

As shown in FIGS. 8A-E, there are five types of cubic Bezier curves beyond the degenerate cases of a line and a point. Such curves are generated using formula (7). However, typically a graphics program will only use segments of these curves, segments that are being examined under the local conditions constrained by the actual values of the t interval, 0<=t<=1, as defined in formula (5). By systematically increasing the t interval for each of the five cubic Bezier types, it is possible to examine each curve segment under global conditions. With testing, it became clear that the number of types reduces to four, where the arch extends to one of the types bump, or cusp or loop for increased t intervals. For example, altering the t interval to −1<=t<=1 can change the shape from arch to bump, or cusp or loop. The result is dependant upon the original end points and control point of the arch. In other words, an arch, when extended under increased t intervals, will become a bump, cusp or loop type curve.

While it would be impossible to test all possible cases of this method, it is believed that the tests performed are adequate to demonstrate that these extensions will generate matches that are sufficiently useful to the user as to make software according to the invention an advantageous improvement over existing graphics software.

The extended t interval chosen above is a matter of design choice. The larger the interval, the more the approximating curve extends beyond the original drawing. One criterion for the t interval might be the size of the canvas, in other words that the parameters be chosen so that the resulting extensions do not go beyond that size.

Responsive to the extended curves, the processor(s) calculate registration points as in step 350 of method 300. In the preferred embodiment, these registration points are the intersections of the curves on the canvas. The sub-division algorithm of de Casteljau as in SHIRLEY, P. and ASHIKHMIN, M. *Fundamentals of computer graphics*, 2nd ed. 2005, Wellesley, Mass.: AK Peters. xv, 623 p., is one way of searching for cubic Bézier intersections by checking the convex hulls of the curves for overlap. If convex hulls do not overlap, then the curves do not intersect. If the convex hulls do overlap, the processor(s) check the flatness of the curves within the hull. If the curves approximate a flat line, then the processor(s) find the intersection, for instance by using a method for lines from the literature, SCHNEIDER, P. J. and EBERLY, D. H., *Geometric Tools for Computer Graphics*, (The Morgan Kaufmann Series in Computer Graphics and Geometric Modeling: recursive sub-division search for the intersection of two lines). If the curves do not approximate a straight line, the processor(s) continue to recursively subdivide the curves checking for overlapping convex hulls and nearly straight curves.

Figure 9A:
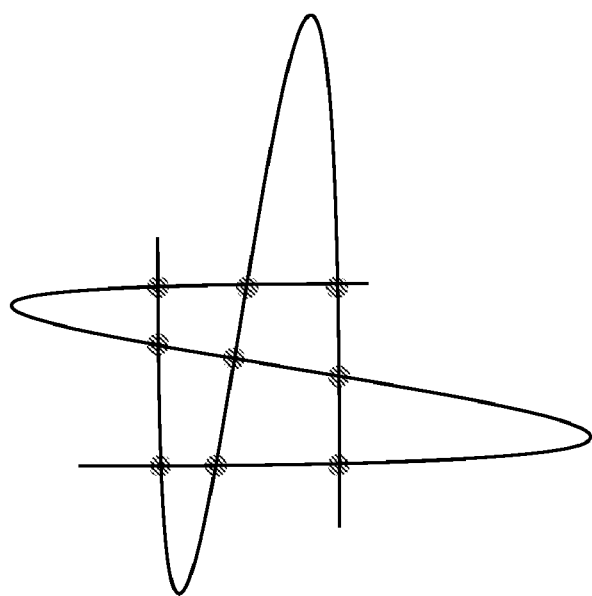
FIG. 9 shows cubic Bézier intersections
Figure 9B:
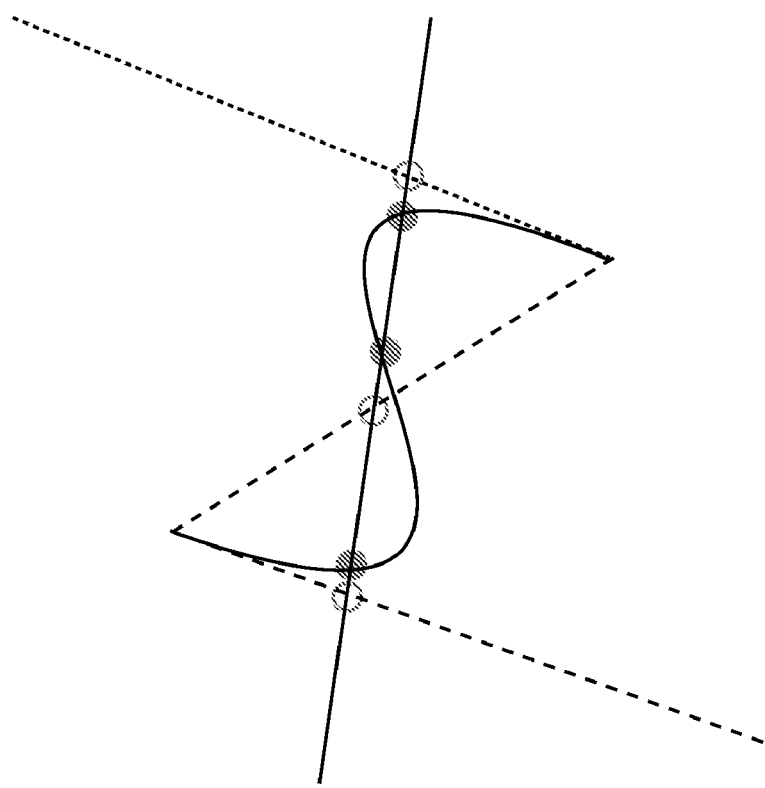

As in FIG. 9, Two Béziers can possibly intersect in up to nine (9) places within a canvas compared to two lines, which can only intersect at one point. Also, the variation diminishing property, MORTENSON, M. E., *Computer Graphics: an Introduction to the Mathematics and Geometry* (1989, New York, N.Y.: Industrial Press. X) 381 p. of cubic Béziers reveals that a line will intersect a Bézier at most the number of times the line intersects the Bézier's control polyline.

The search is conducted in step 360 where the system attempts to match a predefined shape object with all of the explicit and implicit shape objects in the drawing space. A shape object includes registration points and maximal elements. The term "predefined" is used in 360 to refer to those registration points and maximal elements generated responsive to the rule. There are a number of known algorithms for matching data. In testing, the following was used: the matching was done by binding the contents of rule variables that represent control points of the explicit and implicit shape objects in the drawing space and the predefined shape object in accordance with the unification algorithm inherent in logic programming languages such as Prolog in O'KEEFE, R. A., *The craft of Prolog*. Logic programming. 1990, Cambridge, Mass.: MIT Press. xix, 387 p. If a match is found as in step 370 then user interaction occurs as in 375 and the found shape object is transformed in step 380 by modifying or replacing the shape object according to the shape transformation rule as in FIGS. 5E-1 & 5E-2

If no match is found in the drawing space, then the method ends in step 390; and additional information must be solicited from the user before continuing.

FIG. 4 shows two shape objects 410 and 420.

Shape object 410 is defined by the curve end points M0, M3 and the curve control points M1, M2. Shape object 420 is defined by the curve end points N0, N3 and the curve control points M1, M2. In FIG. 4, each of the shape objects 410 and 420 are extended to their maximal elements where 410 is extended to include 412 and 414 and where 420 is extended to include 422 and 424. In this figure, the shape objects are indicated by curves of heavier weight, while the extensions are indicated by curves of lighter weight. The system of shape objects formed by 410, 412, 414, 420, 422, 424 results in the registration points 430 and 440, which are circled for emphasis.

FIGS. 5A-5E show an example of the method 300.

Figure 5A:
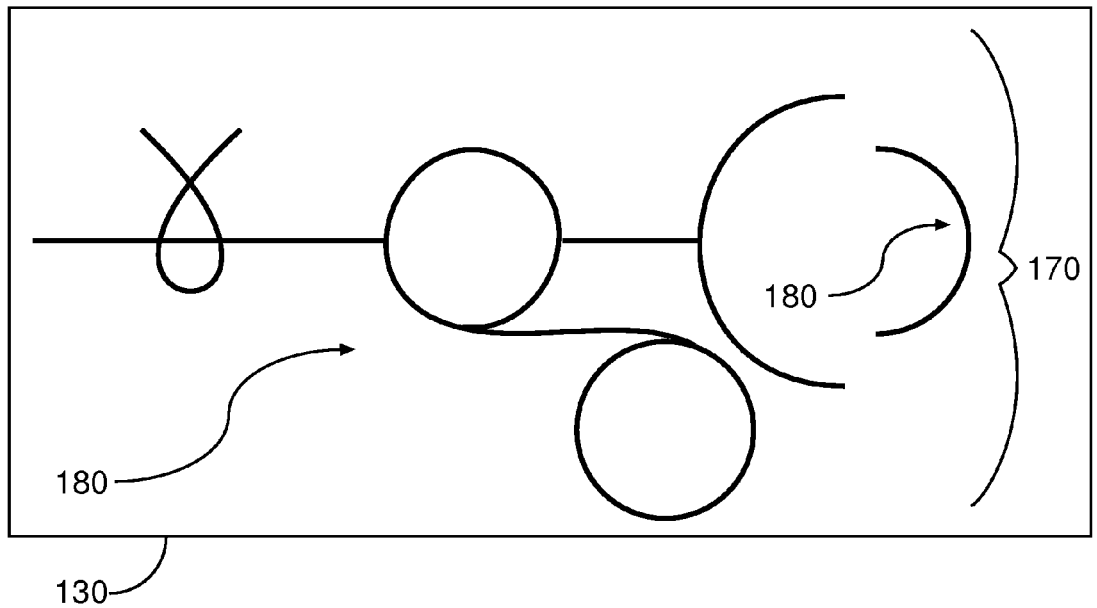
FIG. 5A shows a drawing space object of shape objects

FIG. 5A shows a drawing space object 130 of curvilinear shape objects 170 and 180.

Figure 5B:
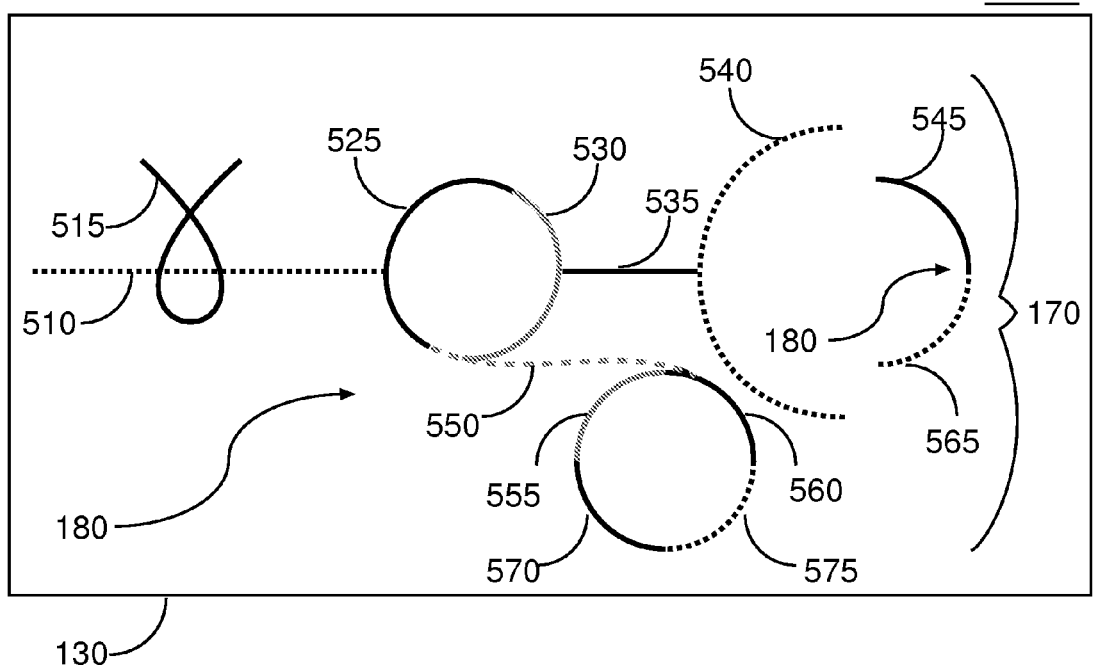
FIG. 5B shows the drawing space of FIG. 5A represented as maximal elements

FIG. 5B shows the drawing space 500 of FIG. 5A represented as maximal elements 510, 515, 525,530, 535, 540, 545, 550, 555, 560, 565, 570, 575 resulting from step 330 of the method 300. Separate maximal elements are shown with different styles of curve here: heavy, light, dashed, dotted. These styles are for ease of comprehension only. The styles do not need to be shown to the user, who will continue to see only FIG. 5A at this point, and are not necessarily represented inside a computer using the invention. Some shapes that may look to the user as if they are a single shape will be decomposed into more than one maximal element, due to the approximate character of the Bézier curves. Thus, for instance, maximal elements 525 and 530 may look like a single circle to the user, but internally they are stored as two maximal elements. Similarly, elements 555, 560, 570, and 575 may look like a single circle, but they are stored as 4 maximal elements. This difference in internal representation of two apparent circles results from the idiosyncratic way in which the user has drawn these shapes, which mean that the shapes that might look identical to the user are not mathematically identical inside the machine. For instance, the machine may perceive the "circle" of 550, 560, 570, 575 as "more circular" than the "circle" of 525, 520 which is "less circular." This example is only illustrative. Other internal representations might be chosen for this figure.

Figure 5C:
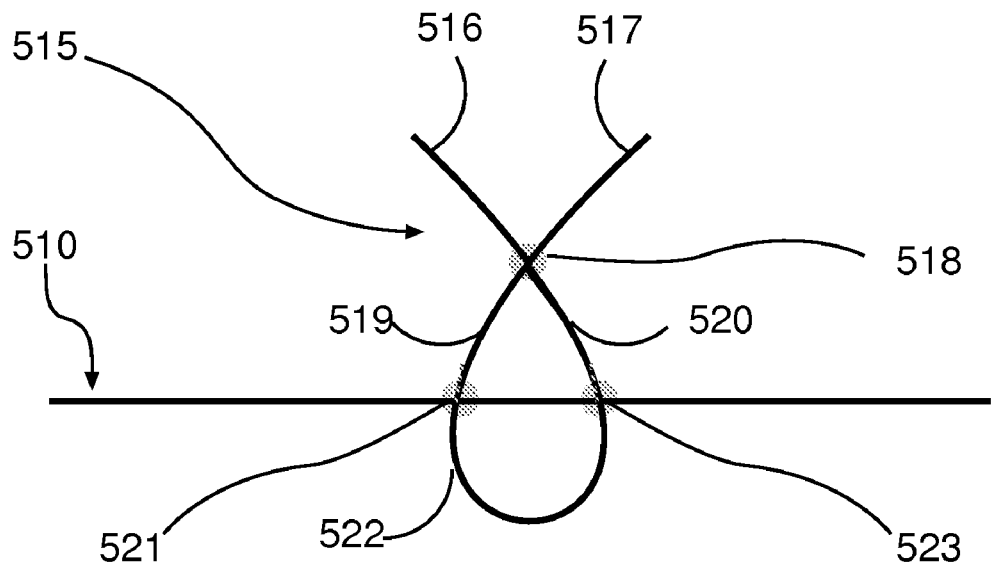
FIG. 5C shows a portion of the drawing space of FIG. 5B

FIG. 5C shows a portion of the drawing space of FIG. 5B depicting maximal elements 510 and 515. The registration points 518, 521 and 523 divide the maximal element 515 into sub-shape objects specifically represented by the curvilinear shapes 516, 517, 519, 520, 522

Figure 5D:
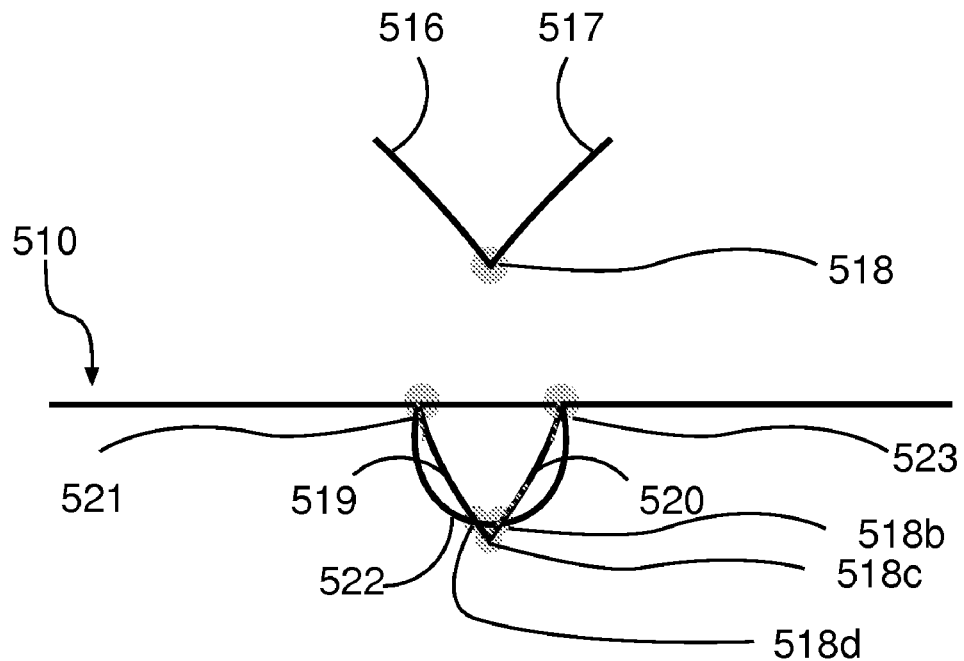
FIG. 5D shows a portion of the drawing space of FIG. 5B after the application of a shape rule defined by a pattern of registration points and maximal elements as in FIGS. 5E-1 shows the left hand side of a shape rule defined by a pattern of registration points and maximal elements
Figures 1, 2, 5E:
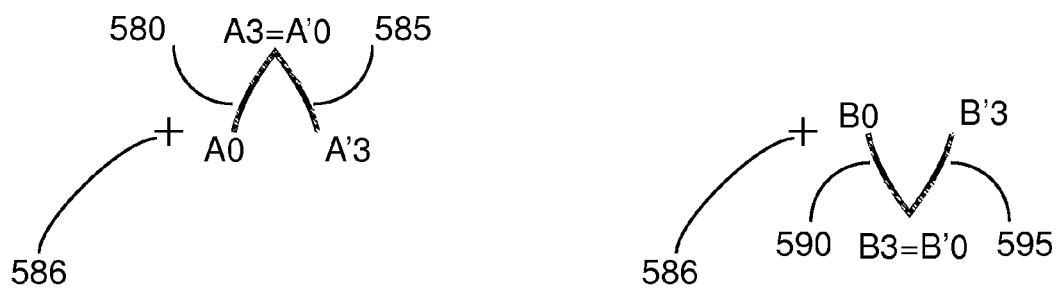
FIGS. 5E-2 shows the right hand side of a shape rule defined by a pattern of registration points and maximal elements FIGS. 6A-E and A'-E' show the reduction rules for curvilinear shapes for determining maximal elements and ways in which each of such rules may fail

FIGS. 5E-1 and FIGS. 5E-2 show a shape transformation rule.

FIGS. 5E-1 represents the left hand side of the rule, or the user-created shape that is being searched for in the drawing; while FIGS. 5E-2 represents the right hand side of the rule, or the user-created shape that will replace the searched for shape from FIGS. 5E-1. The rules can be visualized as actual shapes, which is why the computations are attractive for visual manipulations. The search uses a pattern of registration points and maximal elements as in step 360 of method 300. Registration points help to more accurately find the left hand side of the rule within the context of a drawing space.

In FIGS. 5E-1, curve A is the sum of 580 and 585 defined by the points A0, A3, A'0 and A'3. In FIGS. 5E-2, curve B is the sum of 590 and 595 defined by the points B0, B3, B'0, B'3. 586 represents the pivot point for transforming the curve A to the curve B.

FIG. 5D shows a portion of the drawing space of FIG. 5B after the application of step 380 of the method 300. According to the shape rule defined by a pattern of registration points and maximal elements as in FIGS. 5E-1-2, shape objects 519 and 520 are found to match in their original positions as in FIG. 5C. Application of the rule of FIGS. 5E-1 & 5E-2 results in the transformation of FIG. 5C to FIG. 5D, where shape object 515 no longer exists and now shape objects 519 and 520 have been rotated to a location below shape object 510. Similarly, registration point 518 no longer exists and new registrations points 518b, 518c, 518d are found as in step 350 of the method 300. 510, 516, 517, 519, 520, 522 are the maximal elements of FIG. 5D.

Alternate Embodiments

The examples shown here illustrate cubic Béziers curves in a two (2) dimensional drawing space. Alternate embodiments include:

Drawing spaces of higher dimensions.

Curves defined by other representations, such as:
lower order Bézier curves
higher order Bézier curves
B-Splines curves
Hermite curves.
Curves that have variations in stroke attributes such as:
variation in weight
variation in transparency
variation in color
variation in pattern
variation in blend
Curves that form closed regions with variations in fill attributes such as:
variation in transparency
variation in color
variation in pattern
variation in blend From reading the present disclosure, other modifications will be apparent to persons skilled in the art. Such modifications may involve other features which are already known in the design, manufacture and use of computer graphics, computer vision and image recognition and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

I claim:

1. A computer method comprising executing operations on a data processing device, the operations comprising:
maintaining a representation of a drawing;
receiving a command representation of a curvilinear shape to be found in the drawing; and
providing a revised drawing including an indication of a candidate shape from the drawing, the revised drawing being a result of additional operations including automated processing of both the first parametric representation and the representation of the curvilinear shape to find a match,
wherein
the command includes a user indication of a desired transformation related to the curvilinear shape; and the additional operations include
using a second parametric representation for the curvilinear shape, responsive to the command;
deriving secondary representations from the first and second parametric representations;
using the secondary representations to create a candidate transformation of the drawing; and
displaying, via a screen, a revised drawing incorporating the candidate transformation.

2. The method of claim 1, wherein the operations further comprise
displaying, via a screen, the drawing derived from the first parametric representation to a user;
receiving the command responsive to a user indication of a portion of the displayed drawing including the curvilinear shape; and
receiving a user response to the revised drawing.

3. The method of claim 1, wherein the candidate transformation comprises one of shape union, rotating, stretching, scaling, translating, and shape difference.

4. The method of claim 1, wherein the additional operations comprise:
processing the first parametric representation by performing processing operations that include:
testing if the first parametric representation is in maximal element form;
transforming the first parametric representation to maximal elements, if the first
parametric representation is not already in maximal element form;
extending the maximal elements; and
finding registration points of the extended maximal elements.

5. The method of claim 4, wherein the additional operations further comprise: processing the representation of the curvilinear shape, including
testing if the representation of the curvilinear shape is in maximal element form;
transforming the representation of the curvilinear shape to second maximal elements, if the representation of the curvilinear shape is not already in maximal element form;
extending the second maximal elements; and
finding second registration points corresponding to the extended second maximal elements.

6. The method of claim 5, wherein finding the candidate shape comprises executing a matching operation between the registration points and the second registration points.

7. The method of claim 5, wherein finding the candidate shape comprises executing a matching operation between the extended maximal elements and the extended second maximal elements.

8. The method of claim 5, wherein the additional operations further comprise
maintaining a machine readable first representation of the drawing comprising the registration points and the extended maximal elements;
maintaining a machine readable second representation of the curvilinear shape comprising the second registration points and the second extended maximal elements;
executing a matching operation between the first and second representations; and
editing the drawing responsive to the matching operation.

9. The method of claim 1, wherein the operations further comprise requesting editing of the candidate shape responsive to a transformation that includes one of: shape union, rotating, stretching, scaling, translating, and shape difference.

10. The method of claim 1, wherein the operations and additional operations are performed on a system within user premises.

11. The method of claim 1, wherein at least some of the operations and/or the additional operations are performed on a system remote from user premises.

12. The method of claim 1, wherein the operations further comprise generating a rule responsive to a user-created image of a portion of the drawing and a user-created image of a transformed version of the portion.

13. A non-transitory machine readable medium embodying machine readable code, the code being adapted to cause a data processing device to perform operations, the operations comprising:

maintaining a parametric representation of a drawing;

receiving a command including a representation of a curvilinear shape to be found in the drawing; and providing a revised drawing including an indication of a candidate shape from the drawing, the revised drawing being a result of additional operations including automated processing of both the parametric representation and the representation of the curvilinear shape to find a match wherein:

the command includes a user indication of a desired transformation related to the curvilinear shape; and the additional operations include using a second parametric representation for the curvilinear shape, responsive to the command;

deriving secondary representations from the first and second parametric representations;

using the secondary representations to create a candidate transformation of the drawing; and displaying, via a screen, a revised drawing incorporating the candidate transformation.

14. Apparatus comprising: a data processing device for executing operations, an at least one input/output device communicating with the data processing device, and at least one a data storage device communicating with the data processing device for storing and retrieving machine executable code and machine readable data; the storage device comprising the medium of claim 13.

15. A computer method comprising executing operations on a data processing device, the operations comprising:

maintaining a machine readable representation of a drawing space suitable for display on a screen, the drawing space comprising a curvilinear shape;

processing the machine readable representation to identify maximal elements of the curvilinear shape;

creating a machine readable representation of extended maximal elements;

finding registration points of said extended maximal elements; and providing a graphical user interface, responsive to the extended maximal elements and/or the registration points, adapted to allow a user to graphically manipulate the curvilinear shape.

16. The method of claim 15, wherein the curvilinear shape is derived from user drawn and/or stroked curvilinear indications.

17. The method of claim 15, wherein the operations further comprise, not necessarily in the following order, first executing the processing, creating, and finding operations with respect to a curvilinear path in a drawing space;

second executing the processing, creating, and finding operations with respect to the curvilinear shape; and matching results of the first and second executing to yield a selection of a portion of the curvilinear path corresponding to the curvilinear shape.

18. A non-transitory medium readable by a data processing device embodying a machine readable representation of a curvilinear shape, the representation comprising results of automated processing of the shape, the automated processing comprising operations being executed on a digital data processing device, the representation comprising an extended maximal element of the curvilinear shape; and a registration point of the extended maximal elements.

19. The medium of claim 18, wherein the representation further comprises a stroke.

20. The medium of claim 18, wherein each registration points represents an intersections of at least two extended maximal elements.

* * * * *